United States Patent
Long et al.

(10) Patent No.: US 8,527,169 B2
(45) Date of Patent: Sep. 3, 2013

(54) CONTROL FOR TORQUE CONVERTER HAVING MULTIPLE SELECTIVELY ENGAGEABLE CONVERTER COUPLERS

(75) Inventors: Charles F. Long, Pittsboro, IN (US); David C. Ames, Avon, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 1119 days.

(21) Appl. No.: 12/400,907

(22) Filed: Mar. 10, 2009

(65) Prior Publication Data

US 2010/0035722 A1 Feb. 11, 2010

Related U.S. Application Data

(60) Provisional application No. 61/045,141, filed on Apr. 15, 2008.

(51) Int. Cl.
  *G06F 7/00* (2006.01)
  *G06F 17/00* (2006.01)
(52) U.S. Cl.
  USPC ........... 701/67; 192/3.28; 192/3.29; 477/168; 477/174
(58) Field of Classification Search
  USPC ................... 701/67, 68; 192/3.28, 3.29, 3.3, 192/3.31; 477/64, 80, 84, 168, 169, 174–176
  See application file for complete search history.

(56) References Cited

U.S. PATENT DOCUMENTS

| | | | |
|---|---|---|---|
| 4,070,927 A | 1/1978 | Polak | |
| 5,319,949 A | 6/1994 | Long et al. | |
| 5,601,506 A | 2/1997 | Long et al. | |
| 5,616,093 A | 4/1997 | Long et al. | |
| 5,802,490 A * | 9/1998 | Droste | 701/51 |
| 6,179,107 B1 * | 1/2001 | Hall, III | 192/109 F |
| 6,474,456 B2 * | 11/2002 | Suzuki et al. | 192/3.29 |
| 6,494,303 B1 | 12/2002 | Reik et al. | |
| 6,585,617 B1 * | 7/2003 | Moorman et al. | 475/119 |
| 6,622,835 B2 * | 9/2003 | Moorman et al. | 192/3.58 |
| 6,662,918 B2 * | 12/2003 | Takeuchi et al. | 192/3.29 |
| 7,011,603 B2 * | 3/2006 | Kobayashi et al. | 477/62 |
| 7,255,214 B2 * | 8/2007 | Long et al. | 192/85.01 |
| 7,285,066 B2 | 10/2007 | Long et al. | |
| 7,288,039 B2 | 10/2007 | Foster et al. | |
| 7,296,667 B2 | 11/2007 | Maienschein et al. | |
| 7,329,205 B2 | 2/2008 | Preisner et al. | |
| 8,070,637 B2 * | 12/2011 | Long et al. | 475/119 |
| 8,225,915 B2 * | 7/2012 | Ames et al. | 192/3.25 |
| 2002/0014958 A1 * | 2/2002 | Inoue et al. | 340/453 |
| 2003/0114261 A1 * | 6/2003 | Moorman et al. | 475/116 |
| 2004/0144608 A1 * | 7/2004 | Kobayashi et al. | 192/3.3 |
| 2004/0188208 A1 * | 9/2004 | Leber | 192/3.25 |
| 2005/0181904 A1 * | 8/2005 | Younger | 475/128 |
| 2005/0245353 A1 * | 11/2005 | Scelers | 477/127 |
| 2006/0016653 A1 * | 1/2006 | Legner | 192/3.25 |
| 2006/0094555 A1 * | 5/2006 | Long et al. | 475/116 |
| 2006/0184303 A1 | 8/2006 | Long et al. | |
| 2006/0185459 A1 * | 8/2006 | Matsumura et al. | 74/335 |

(Continued)

*Primary Examiner* — Jeffrey Shapiro
(74) *Attorney, Agent, or Firm* — Barnes & Thornburg LLP

(57) ABSTRACT

An apparatus and method of controlling a torque transmitting apparatus having multiple selectively engageable couplers is provided. The multiple couplers may be selectively engaged and disengaged to provide a mechanical, friction or fluid coupling between portions of the torque transmitting apparatus and other components of a vehicle powertrain during various operational stages. The control apparatus includes a fluid pressure control device and a fluid flow control device.

26 Claims, 9 Drawing Sheets

(56) References Cited

U.S. PATENT DOCUMENTS

| | | | |
|---|---|---|---|
| 2006/0196746 A1* | 9/2006 | Nozaki et al. | 192/3.3 |
| 2006/0240938 A1* | 10/2006 | Long et al. | 475/326 |
| 2006/0293147 A1 | 12/2006 | Adams et al. | |
| 2007/0017772 A1* | 1/2007 | Long et al. | 192/109 F |
| 2007/0074943 A1* | 4/2007 | Hemphill et al. | 192/3.25 |
| 2007/0179019 A1 | 8/2007 | Hagelskamp et al. | |
| 2007/0191178 A1* | 8/2007 | Shioiri et al. | 475/319 |
| 2008/0182719 A1* | 7/2008 | Long et al. | 477/127 |
| 2009/0258746 A1* | 10/2009 | Long et al. | 475/131 |
| 2011/0130237 A1* | 6/2011 | Long et al. | 475/127 |

\* cited by examiner

| STAGE | ACTION | ACTUATOR | CONVERTER FLOW VALVE | TRIM SYSTEM PRESSURE | PUMP CLUTCH | LOCK-UP CLUTCH |
|---|---|---|---|---|---|---|
| I | VEHICLE STOP/IDLE | OFF | SPRING SET | MAX | RELEASED | RELEASED |
| II | VEHICLE LAUNCH | OFF | SPRING SET | TRIM | TRIMMED | RELEASED |
| III | NORMAL CONVERTER OPERATION | OFF | SPRING SET | MIN | APPLIED | RELEASED |
| IV | CONVERTER CLUTCH CONTROL | ON | PRESSURE SET | TRIM | APPLIED | TRIMMED |
| V | CONVERTER LOCK-UP | ON | PRESSURE SET | MIN | APPLIED | APPLIED |

FIG. 8

CONTROL FOR TORQUE CONVERTER HAVING MULTIPLE SELECTIVELY ENGAGEABLE CONVERTER COUPLERS

CROSS-REFERENCE

This application claims the benefit of U.S. Provisional Patent Application No. 61/045,141, filed Apr. 15, 2008, which is incorporated herein by this reference in its entirety.

TECHNICAL FIELD

The present invention relates generally to control systems for motor vehicles equipped with automatic transmissions, and more particularly, to methods and systems for controlling operation of a torque transferring apparatus having more than one selectively engageable device for coupling portions of the torque transferring apparatus to other components of the vehicle powertrain.

BACKGROUND

In a vehicle with an automatic transmission, a torque transferring apparatus is used to transfer torque from a drive unit, such as the vehicle engine, to the vehicle transmission. The torque transferring apparatus is typically interposed between the drive unit and the transmission. Fluid couplings, such as torque converters, are widely employed for this purpose.

The typical torque converter has a torque input member (commonly designated as the pump or impeller) and a torque output member (commonly designated as the turbine). A reaction member (commonly designated as the stator) may be interposed between the pump and the turbine to effect a more favorable direction for the flow of hydraulic fluid exiting the turbine and returning to the torque converter pump.

Hydraulic fluid is supplied to the torque converter under pressure by a fluid supply and valve arrangement. Dynamic circulation of the hydraulic fluid through the torque converter effects rotation of the turbine in response to rotation of the torque converter pump.

Typically, the torque converter pump is coupled to the crankshaft of the vehicle engine, while the turbine is connected to an output shaft which exits the torque converter to serve as the input shaft of the vehicle transmission gear assembly.

When a vehicle is not moving, and while the engine is idling (such as when the driver applies the brake, or the transmission is in neutral or park), the torque converter pump is generally not spinning at a sufficient angular velocity to supply the energy necessary to overcome the static inertia of the vehicle. In this situation, the hydraulic fluid simply flows through the turbine, and ideally the turbine does not rotate. This allows the vehicle to remain at rest, even if the transmission has been shifted into a selected drive range (i.e., a forward gear or reverse) and the engine is running.

As a request for vehicle movement is received (such as when the driver releases the brake, applies the accelerator pedal, or shifts into a forward gear), the rotational speed of the engine, and therefore the rotational speed of the torque converter pump, increases. At some rotational speed of the engine, sufficient energy is imparted to the turbine so that it overcomes the static inertia that had previously prevented the vehicle from moving. At that time, the energy transferred from the torque converter pump to the turbine is delivered to the drive wheels through the transmission.

Fluid exits the turbine and reenters the torque converter pump without any redirection, unless an intermediary such as a stator is interposed in the path which the hydraulic fluid follows between its exit from the turbine and its re-entry into the pump. The stator redirects the hydraulic fluid which has exited the turbine so that the fluid will enter the input of the pump in a direction that will cause the fluid to assist the engine in turning the pump. The force imparted by the returning hydraulic fluid to the pump comprises an additional source of kinetic energy. This additional energy applied to the pump results in an increase in the force applied to drive the turbine, providing torque multiplication.

In operation, torque converters require a source of pressurized hydraulic fluid. The hydraulic fluid is generally drawn from the transmission pan or from a sump, and delivered to the torque converter at a predetermined pressure. A valve controls the pressure of the hydraulic fluid supplied to the torque converter. The pressurized hydraulic fluid is supplied to the torque converter, where it is used to effect a hydraulic torque transfer between the pump and the turbine within the torque converter. Thereafter, the fluid is directed through a cooling system to the fluid supply and then recycled.

Torque converter control valves usually permit fluid flow to the torque converter after the pressure at the outlet of the fluid supply reaches a predetermined value. As the pressure continues to increase, the torque converter valve directs excess fluid to the inlet side of the pump.

Torque converters are often provided with a clutch assembly that effectively locks the torque converter pump and the turbine into a unitary rotating mass under certain operating conditions, for example, when "slip" (i.e., a difference in rotational speed) between the pump and the turbine is not required. Typically, the torque converter clutch or "lockup" clutch is activated to effect unitary rotation of the torque converter pump and turbine in response to reduced hydraulic pressure within the torque converter.

The torque converter clutch assembly may also include a pump clutch, which is operable to disconnect the torque converter pump from the vehicle drive unit. This may be desirable when the vehicle is idling, for example. Embodiments of a torque converter having a clutch assembly including a torque converter clutch and a pump clutch are described in Hemphill et al., U.S. Patent Application Publication No. US 2007-0074943.

SUMMARY

In one aspect of the present invention, a control for a torque converter is provided. The control is directed to a torque converter having multiple selectively and independently engageable clutches. The control includes a valve and fluid passage assembly operably couplable to the torque converter to control the engagement and disengagement of the clutches during phases of operation of the torque converter. The valve and fluid passage assembly includes at least one multiplexed pressure control valve. In other words, according to at least one embodiment, the number of pressure control valves in the valve and fluid passage assembly is less than the number of clutches of the torque converter.

The control may include a fluid flow control valve in fluid communication with the pressure control valve. The fluid flow control valve may include a first fluid chamber to selectively communicate with a first clutch of the torque converter, a second fluid chamber to selectively communicate with a second clutch of the torque converter, and a third fluid chamber to selectively communicate with one of the first and second clutches.

The fluid flow control valve has a first position and a second position. When the fluid flow control valve is in the first position, the third fluid chamber may be in fluid communication with the first clutch, and when the fluid flow control valve is in the second position, the third fluid chamber may be in fluid communication with the second clutch. When the third fluid chamber is in fluid communication with the first clutch, the first fluid chamber may be in fluid communication with the second clutch. When the third fluid chamber is in communication with the second clutch, the second fluid chamber may be in fluid communication with the first clutch.

The control may also include an actuator coupled to the fluid flow control valve to change the position of the fluid flow control valve, and an electrical control unit to send electrical signals to the actuator to change the position of the fluid flow control valve.

According to another aspect of the present invention, a control for a torque converter having multiple selectively and independently engageable clutches is provided. The control includes a valve system operably couplable to the torque converter to control the engagement, trimming, and disengagement of each of the clutches during different phases of operation of the torque converter.

The valve system may include a trim valve and a logic valve in fluid communication with the trim valve. Further, the valve system may include multiple fluid passages to connect the torque converter clutches to the logic valve, and one fluid passage connecting the trim valve and the logic valve. The valve and fluid passage assembly may be incorporated into an electro-hydraulic control system for a vehicle transmission.

In another aspect of the present invention, a control for a torque transferring apparatus of a vehicle is provided, including an actuator and a flow control device. The actuator has a first actuator state and a second actuator state. The flow control device has a first device state and a second device state. The flow control device is in fluid communication with the actuator, such that when the actuator is in the first actuator state and the flow control device is in the first device state, the actuator and the flow control device are in fluid communication with a first coupler of a torque transferring apparatus operable to transfer torque from a drive unit of a vehicle to a driven unit of the vehicle.

The first coupler is coupled to a first portion of the torque transferring apparatus and is selectively couplable to a portion of the drive unit of the vehicle. The drive unit provides torsional input to the first portion of the torque transferring apparatus. When the actuator is in the second actuator state and the flow control device is in the second device state, the actuator and the flow control device are in fluid communication with a second coupler of the torque transferring apparatus.

The second coupler is coupled to a second portion of the torque transferring apparatus spaced from the first portion of the torque transferring apparatus. The second portion of the torque transferring apparatus provides torsional output to the driven unit of the vehicle. Also, the second coupler is selectively couplable to the first portion of the torque transferring apparatus.

The control may also include a pressure control device in fluid communication with the flow control device. According to one embodiment, the actuator is "off" in the first actuator state, and the actuator is "on" in the second actuator state. Further, in one embodiment, the flow control device is a flow valve and the flow valve is in a spring set position in the first device state, and the flow valve is in a pressure set position in the second device state. In certain embodiments, the first coupler is a pump clutch and the second coupler is a torque converter or lockup clutch.

According to one embodiment, when the flow control device is in the first device position, the second coupler is disengaged, and when the flow control device is in the second device position, the first coupler is engaged.

In yet another aspect of the present invention, a control for a torque transferring apparatus is provided, including a fluid supply, a control assembly, and electrical circuitry. The control is directed to a torque transferring apparatus which transfers torque from a drive unit of a motor vehicle to a driven unit of the motor vehicle. The control assembly is operably coupled to the fluid supply, and includes a fluid pressure control apparatus and a fluid flow control apparatus in fluid communication with the fluid pressure control apparatus. The electrical circuitry is operably coupled to the control assembly.

The control cause a first coupler of a torque transmitting apparatus to selectively engage and disengage from an output member of a vehicle drive unit and causes a second coupler of the torque transmitting apparatus to selectively engage and disengage from a first portion of the torque transmitting apparatus.

The fluid pressure control apparatus may include a trim valve and the fluid flow control apparatus may include a flow valve having a first state and a second state. An actuator may be provided to selectively change the state of the flow valve from the first state to the second state. In at least one embodiment, the controller sends at least one electrical signal to the actuator to change the state of the flow valve. The flow valve may control the first coupler when the flow valve is in the first state and may control the second coupler when the flow valve is in the second state.

According to a further aspect of the present invention, a control for a torque transferring apparatus of a vehicle is provided, including an electrical control apparatus and a tangible medium including executable programming instructions. The electrical control apparatus receives signals indicative of the operational state of a vehicle and executes executable instructions to control operation of the torque transferring apparatus. The tangible medium is accessible by the electrical control apparatus. The executable instructions include logic to determine an operational state of a vehicle having a drive unit, a transmission, and a torque transferring apparatus, which transfers torque from the drive unit to the transmission. The logic is adapted for a torque transferring apparatus having a first coupler and a second coupler, where the first coupler is coupled to a first portion of the torque transferring apparatus and is selectively couplable to an output member of the vehicle drive unit; while the second coupler is coupled to a second portion of the torque transferring apparatus and is selectively couplable to the first portion of the torque transferring apparatus.

The instructions also include logic to selectively change a state of a torque transferring apparatus control assembly from a first state to a second state in response to a change in the operational state of the vehicle. In at least one embodiment, the torque transferring apparatus control assembly includes at least one electro-hydraulic apparatus. The process of selectively changing a state of the torque transferring apparatus control assembly includes selectively applying electrical current to a portion of the electro-hydraulic apparatus.

Also in certain embodiments, the torque transferring apparatus control assembly selectively alters fluid pressure in at least a portion of the electro-hydraulic apparatus based on the operational state of the vehicle and also selectively alters a path of fluid flow in at least a portion of the electro-hydraulic apparatus based on the operational state of the vehicle. In one or more embodiments, at least the electrical control apparatus is incorporated in a transmission control module of the vehicle.

Patentable subject matter may include one or more features or combinations of features shown or described anywhere in this disclosure including the written description, drawings, and claims.

BRIEF DESCRIPTION OF THE DRAWINGS

The detailed description refers to the following figures in which:

FIG. 8 is a table indicating the status of different components of the torque transferring apparatus and control assembly through the various stages of operation.

Figure 1:
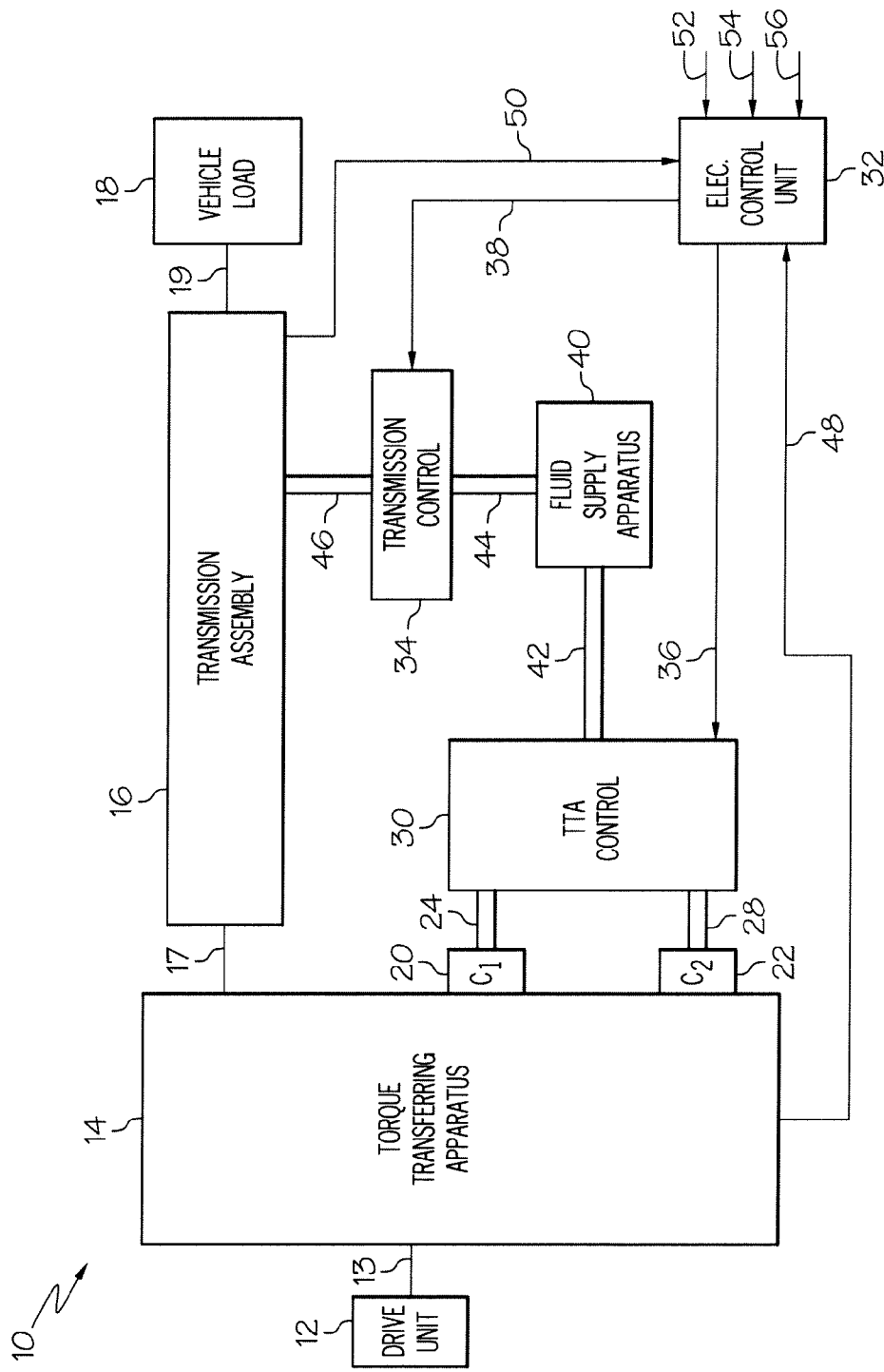
FIG. 1 is a block diagram representing a portion of a vehicle powertrain including a drive unit, a transmission, a torque transferring apparatus, a plurality of coupling devices coupled to the torque converter, and a control assembly coupled to the coupling devices.

In general, like structural elements on different figures refer to identical or functionally similar structural elements although reference numbers may be omitted from certain views of the drawings for simplicity.

DETAILED DESCRIPTION

Aspects of the present invention are described with reference to certain illustrative embodiments shown in the accompanying drawings and described herein. While the present invention is described with reference to the illustrative embodiments, it should be understood that the present invention as claimed is not limited to the disclosed embodiments.

Motor vehicles typically have several different modes or phases of operation, including idle, launch, torque conversion, and "lockup" modes. Motor vehicles also often experience a variety of different events and conditions during operation, relating to terrain, temperature, driver preferences, traffic conditions, and/or other factors. The vehicle transmission is often expected to respond to these conditions and events to cause the vehicle speed to adjust appropriately and in a smooth and efficient manner.

In torque converters that are equipped with multiple clutches or similar couplers, such as the arrangements disclosed in U.S. Patent Application Publication 2007/0074943 to Hemphill, et al. ("Hemphill"), the multiple torque converter couplers may be selectively engaged and disengaged to provide greater engine efficiency and/or smoother transitions as the vehicle operates in different phases or encounters different operating conditions or events.

For example, during the idle phase, both the pump clutch and the torque converter or lockup clutch of a torque converter having a dual clutch arrangement may be disengaged. During the launch and torque converter phases, the pump clutch may be engaged while the lockup clutch remains disengaged. During the lockup phase, both the pump clutch and the lockup clutch may be engaged.

Hemphill discloses several embodiments of torque converters having multiple clutches or similar devices, as well as fluid chambers within the torque converter for receiving pressurized fluid to control operation of the clutches. Hemphill mentions that valves are used to control pressure in the fluid chambers of the torque converter. However, Hemphill does not disclose any structure other than the torque converter arrangement itself. In particular, Hemphill does not disclose any valve control assembly for controlling the multiple-clutch torque converter.

Simplified and sophisticated control of the torque converter clutches or couplers can be achieved with a valve assembly operably coupled to one or more electrical controls, as disclosed herein. Interfacing of the torque converter clutch control with a transmission control assembly expands the range of possible inputs to the torque converter clutch control to include transmission control parameters, such as transmission input speed, transmission output speed, turbine speed, driver-requested torque, and engine output torque, to name a few, thereby additionally enabling a finer degree of control of the torque converter and its clutches or couplers.

For instance, closed-loop control methods including but not limited to those known as reduced engine load at stop ("RELS"), variable K factor control, and electronic converter clutch control ("ECCC"), may be applied to multiple-clutch arrangement torque converters such as Hemphill's, through application of aspects of the present invention.

In idle mode, when the vehicle is turned on but in a stopped position, it is desirable for little or no torque to be transferred to the drive wheels while the engine is running. Mechanical decoupling of the vehicle transmission from the drive unit during the stopping and/or idling phases can be provided by disengagement of a torque converter pump clutch and disengagement of a torque converter lockup clutch, to reduce the load on the vehicle drive unit, thereby improving engine efficiency and fuel economy. Aspects of the present invention provide a "reduced engine load at stop" method for releasing the pump clutch during the idle phase, while the torque converter clutch is also released and a relatively constant pressure is maintained in the torus cavity of the torque converter, as further described below.

As a request for motion is received, the vehicle transitions to the creep or launch phase. During the launch phase, engine speed typically increases to begin to cause torque to be transferred to the vehicle drive wheels through the torque converter and transmission gear assembly. Often, a lower gear ratio is desired during the launch phase to achieve a smoother and/or faster transition. During the launch phase, aspects of the present invention provide a method of variable k factor trimming of the pump clutch to control the application or engagement of the pump clutch, as further described below with reference to the illustrative embodiment.

During the normal torque converter phase, shifts to higher gears may occur. The transmission input speed (i.e. torque converter pump speed) and the turbine speed are still normally greater than the actual vehicle speed, and the torque converter pump speed is greater than the turbine speed. Torque multiplication is typically provided during the launch and torque converter phases. During these phases, aspects of the present invention maintain the engagement of the pump clutch while maintaining the disengagement of the lockup clutch and maintaining a relatively constant pressure in the torus cavity of the torque converter.

Figure 7:
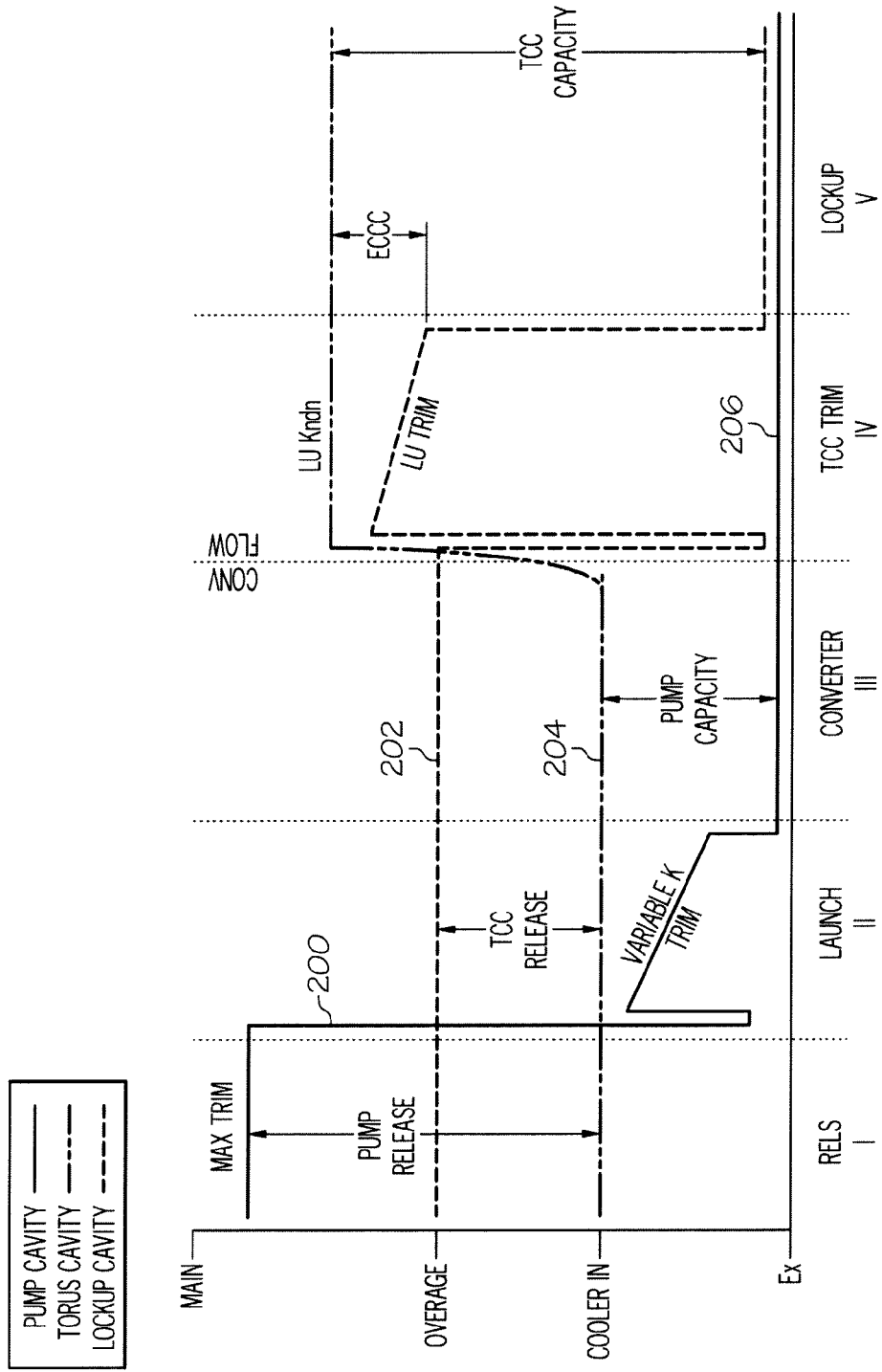
FIG. 7 is a graph illustrating changes in pressure in different portions of the torque transferring apparatus through various stages of operation, according to the embodiment of the control assembly shown in FIGS. 2-6.

Aspects of the present invention provide a "torque converter clutch trim" phase or "TCC trim" phase, as shown in FIG. 7, described below. During the TCC trim phase, the lockup clutch is trimmed to provide a greater degree of control over the application and release of the lockup clutch while at the same time maintaining engagement of the pump clutch and managing the fluid pressure in the torus cavity of the torque converter.

A trim phase generally allows smoother engagement or disengagement of the clutch or coupler by providing a steady increase or decrease in fluid pressure. A steady, predictable increase or decrease in pressure as a clutch is being applied or released may be desirable for improved shift quality or for other reasons.

During the lockup mode, the torque converter pump and the turbine are generally spinning at the same speed. To improve engine efficiency during this phase, it is often desirable to mechanically couple the torque converter pump and the turbine to reduce inefficiencies resulting from the fluid flow through the torque converter. A torque converter clutch or lockup clutch is often provided for this purpose. During the lockup phase, aspects of the present invention provide known closed loop electronic converter clutch control methods ("ECCC") to manage application or engagement of the lockup clutch.

Also during the TCC trim and lockup phases, aspects of the present invention provide a knockdown feature on the main regulator valve, wherein pressure is reduced at the main regulator valve.

In general, the controls and methods of the present invention provide that the pump clutch is disengaged in the idle phase, trimmed in the launch phase, and engaged through the converter, TCC trim and lockup phases; while the lockup clutch generally remains disengaged through the idle, launch and converter phases, is trimmed in the converter clutch control phase, and is engaged in the lockup phase, as shown by the table of FIG. 8.

FIG. 1 depicts a simplified block diagram of a vehicle powertrain 10, including a drive unit 12, a torque transferring apparatus 14, a transmission assembly 16, and a vehicle load 18. Drive unit 12 generally provides a torque output to torque transferring apparatus 14 via an output shaft 13. Drive unit 12 may be an internal combustion engine of a compression-ignition type (i.e. diesel) or a spark-ignition type (i.e. gasoline), an engine-electric motor combination, or the like. Torque transferring apparatus 14 generally converts and/or transfers the torque output from drive unit 12 to the vehicle transmission assembly 16 via turbine shaft or transmission input shaft 17. As such, torque transferring apparatus 14 normally includes a fluid coupling such as a torque converter.

Transmission assembly 16 includes the assembly of gears and clutches that are selectively engaged and disengaged by electro-hydraulic transmission control 34 to cause the vehicle to move at varying speeds. As such, elements of transmission 16 are in fluid communication with elements of control 34 via one or more conduits or passages 46. An example of a suitable transmission assembly is a six-speed planetary gear arrangement, such as shown in U.S. Pat. No. 4,070,927 to Polak. One example of a suitable transmission control for a six-speed transmission is disclosed in U.S. Patent Application Publication No. 2003/0114261 to Moorman, et al. Another example of an electro-hydraulic transmission control system is disclosed in U.S. Pat. No. 5,601,506 to Long, et al.

The present invention may be applied to these and other types of transmission systems, including but not limited to eight-speed automatic transmission systems, as shown in U.S. Provisional Patent Application No. 61/045,141, which is incorporated herein by this reference. Included in such provisional application are diagrams of a manual valve electro-hydraulic control assembly for an eight-speed transmission system and a fly-by-wire electro-hydraulic control assembly for an eight-speed transmission system. These diagrams show converter controls such as control 30, 31, including a multiplexed trim system and a converter flow valve such as valve 130, incorporated into the control assembly for the manual system and the control assembly for the fly-by-wire system.

Transmission 16 drives the vehicle load 18 via transmission output shaft 19. Vehicle load 18 generally includes the drive wheels and driven load mass. The actual weight of vehicle load 18 may be quite considerable and/or vary considerably over the course of the vehicle's use, as may be the case with commercial vehicles such as trucks, buses, emergency vehicles, and the like.

Torque transferring apparatus 14 includes a plurality of selectively engageable and disengageable couplers 20, 22 configured to alter the coupling (or lack thereof) between drive unit 12 and transmission 16. Couplers 20, 22 are generally configured to selectively achieve a mechanical, fluid or friction coupling between components of the drivetrain 10 in response to various conditions or changes in conditions. For instance, couplers 20, 22 may be torque transmitting devices or friction devices. Couplers 20, 22 may be fluid-operated devices such as clutch- or brake-type devices. As such, couplers 20, 22 may be stationary- or rotating-type devices. Couplers 20, 22 may be torque converter clutches or similar functioning devices, pump clutches or similar functioning devices, or a combination thereof.

In general, couplers 20, 22 can be operated independently of each other. For instance, couplers 20, 22 may be simultaneously engaged, simultaneously disengaged, or one of couplers 20, 22 may be engaged while the other is disengaged.

Couplers 20, 22 may be couplable to respective portions of powertrain 10 by various means, including being splined to a piston and/or connected to a clutch plate. A friction material may be applied to one or more portions of couplers 20, 22 to facilitate engagement or for other reasons.

Couplers 20, 22 are in fluid communication with torque transferring apparatus (TTA) control 30 via one or more lines or conduits 24, 28. Control 30 includes electro-hydraulic controls configured to selectively engage and disengage couplers 20, 22 from other elements of the powertrain 10. For instance, coupler 20 may be configured to couple a portion of the torque transferring apparatus 14 to a portion of the drive unit 12, while coupler 22 may be configured to couple portions of the torque transferring apparatus 14 together.

Control 30 includes an electro-hydraulic valve assembly configured to selectively control the application, trimming, and release of couplers 20, 22. For example, control 30 may adjust a path of fluid flow and/or adjust pressure of fluid in one or more of the lines 24, 28 to engage and disengage couplers 20, 22 or for other reasons.

While shown as separate elements in FIG. 1, controls 30 and 34 may be part of one electro-hydraulic control assembly. Controls 30 and 34 are in fluid communication with a fluid supply 40 and in electrical communication with an electronic or electrical control unit 32. Fluid supply 40 supplies a pressurized fluidic medium such as hydraulic oil or the like to electro-hydraulic controls 30, 34 through one or more fluid passages or conduits 42, 44. In general, fluid supply 40 includes a fluid reservoir or sump, a pump (such as a hydraulic positive displacement pump, variable displacement pump, or electrically controlled hydraulic pump) for drawing fluid out of the reservoir, a regulator valve for establishing a regulated pressure or main pressure in fluid passages 42, 44, and fluid passages providing fluid communication among the reservoir, pump, valving and fluid lines. A description of an exemplary regulator valve assembly for a torque converter can be found in U.S. Pat. No. 5,319,949 to Long et al.

Electronic control 32 controls the electro-hydraulic controls 30, 34 based on one or more electrical inputs 48, 50, 52, 54, 56. Such inputs may be received from one or more components of the transmission 16, torque transferring apparatus 14, drive unit 12, or other components of the vehicle. Such inputs may include electrical or analog signals received from sensors, controls or other like devices associated with the vehicle components. For instance, inputs 48, 50, 52, 54, 56 may include signals indicative of transmission input speed, driver requested torque, engine output torque, engine speed, temperature of the hydraulic fluid, transmission output speed, turbine speed, brake position, gear ratio, torque converter slip, and/or other measurable parameters.

Electrical control 32 generally includes electrical circuitry configured to process, analyze or evaluate one or more of inputs 48, 50, 52, 54, 56 and issue electrical control signals to controls 30, 34 as needed through one or more electrical lines or conductors 36, 38. Connections 36, 38 may include hardwired and/or networked components in any suitable configuration including, for example, insulated wiring and/or wireless transmission as may be appropriate or desired.

Figure 9:
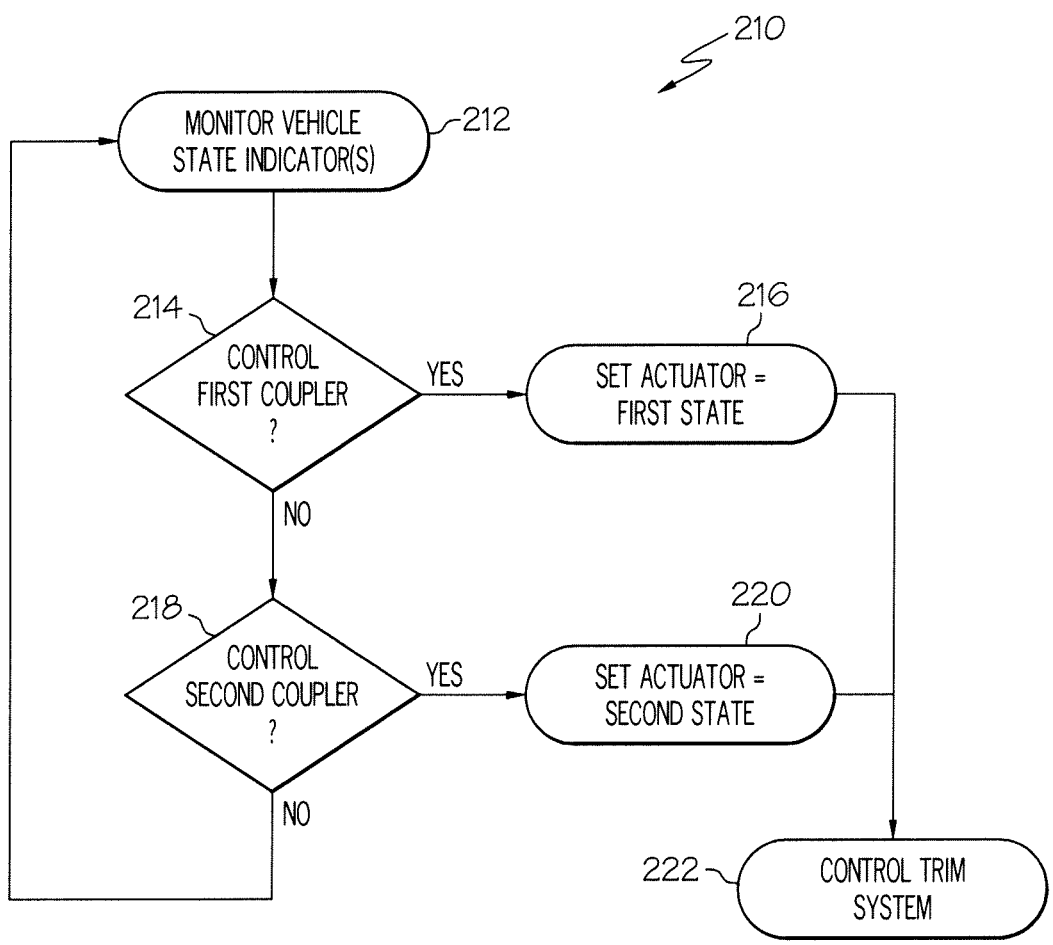
FIG. 9 is a flow diagram illustrating computer-executable operations of a control for a torque transferring apparatus according to the present invention.

Electrical circuitry of control 32 includes computer circuitry such as one or more microprocessors and related elements configured to process executable instructions expressed in computer programming code or logic, which is stored in one or more tangible media, i.e., any suitable form of memory or storage media that is accessible or readable by the processor or processors. Such instructions include commands to selectively alter or adjust the path of fluid flow and/or the fluid pressure in the one or more lines 24, 28 as needed or desired to control the operation of couplers 20, 22. An example of such computer-executable logic is illustrated in FIG. 9, described below. Control 32 may also include analog to digital converters and/or other signal processing circuitry or devices as needed to process one or more of the inputs 48, 50, 52, 54, 56.

While shown schematically as a single block 32, it will be understood by those skilled in the art that portions of control 32 may be implemented as separate logical or physical structures. For example, electronic controls for transmission 16 may be physically and/or logically separated from electronic controls for the torque transferring apparatus couplers 20, 22.

Figure 2:
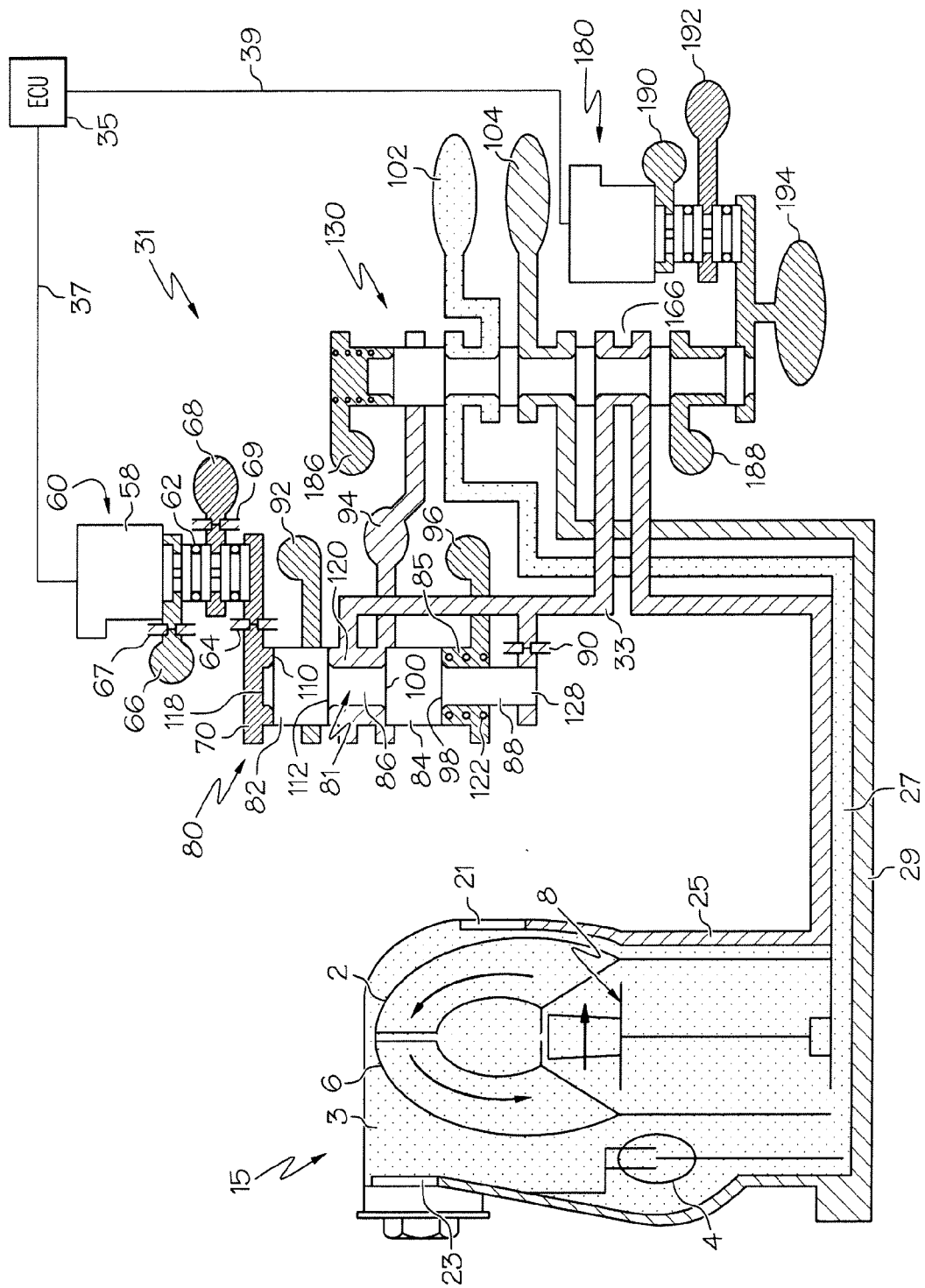
FIG. 2 is a schematic of a portion of one embodiment of the control assembly of FIG. 1, illustrating fluid flow and fluid pressures when the torque transferring apparatus is operating in a first stage.

One embodiment 31 of an electro-hydraulic control assembly 30, for controlling a plurality of couplers 21, 23 of a torque transferring apparatus 15, is shown in FIGS. 2-6. In FIG. 2, control 31 is shown coupled to an exemplary torque transferring apparatus 15, however, control 31 is adaptable for use with other similar devices having more than one coupler such as couplers 21, 23.

Torque transferring apparatus 15 is a torque converter having a multiple-clutch arrangement, such as those described in U.S. Patent Application Publication No. 2007/0074943 to Hemphill et al. Torque converter 15 includes a torque converter pump 2, a torus cavity 3, a turbine 6, a stator 8, a lockup or torque converter clutch 23 and a pump clutch 21. Torque transferring apparatus also includes a damper 4, which may be coupled to pump clutch 21 and lockup clutch 23 as described in Hemphill et al. Examples of a suitable damper are disclosed in U.S. Pat. No. 6,494,303 to Reik et al.

Fluid passages 25, 27, and 29 provide fluid communication between pump clutch 21 and control 31, torus cavity 3 and control 31, and lockup clutch 23 and control 31, respectively.

Control 31 includes a pressure control apparatus 60, 80 and a flow control apparatus 130,180. In the illustrative embodiment, pressure control device 80 is a regulator valve or trim valve, or similar mechanism for varying pressure in the fluid lines 25, 27, 29. Flow control device 130 is a converter flow valve, i.e., a logic valve or relay valve or similar mechanism configured to alter the path of fluid flow from device 80 to fluid lines 25, 27, 29. In this valve configuration, pressure control device 80 is multiplexed to control both of the couplers 21, 23 in the multiple coupler arrangement of the torque transferring apparatus 15. More particularly, in the illustrative embodiment, a single trim valve 80 is used to control operation of both pump clutch 21 and lockup clutch 23.

Pressure control device 80 and flow control device 130 are actuated by actuators 60, 180, respectively. Actuators 60, 180 are in electronic communication with electronic control unit or electrical circuitry 35, which operates in a similar manner to electronic control 32 described above. In the illustrative embodiment, control 35 is implemented as part of a transmission control module or TCM, which is installed in the vehicle.

Actuator 60 may be a variable bleed solenoid valve, a pulse width modulated solenoid valve, a force motor, or similar mechanism configured to vary the force or pressure applied to the trim valve head 118. In the illustrative embodiment, actuator 60 is a normally low (zero current=zero pressure) variable bleed solenoid valve including a solenoid 58. Fluid enters valve 60 through control pressure inlet 68, at a predetermined control pressure set by a regulator valve of a fluid supply similar to fluid supply apparatus 40 described above. In the illustrative embodiment, the control pressure is in the range of about 110 psi.

Fluid may exit valve 60 through exhaust outlet 66. Flow restrictors or orifices 67, 69 are configured to regulate the rate or volume of fluid flowing through valve 60 to thereby regulate the fluid pressure applied to the head of valve 80. As such, the pressure applied to valve 80 depends on the configuration of valve 60, including the size or configuration of orifices 67, 69.

Orifice 67 has a variable-sized opening that is adjusted by solenoid 58, such that when no electrical current is flowing to solenoid 58 through line 37, orifice 67 is wide open, allowing fluid to flow to exhaust 66. As electrical current is applied to solenoid 58 through line 37, orifice 67 begins to close or become smaller, thereby restricting flow to exhaust 66 and allowing fluid pressure to increase in inlet 70 of trim valve 80. Another restrictor or orifice 64 is provided in inlet line 70 to add pressure stability between solenoid 58 and the valve head 118. This allows stepping down the control pressure during the trim phase of control 31 described below with reference to FIG. 3.

Valve 80 is situated in a more or less cylindrical valve chamber of a housing, which is not shown for simplicity. A plurality of fluid ports extend through the housing into the valve chamber at spaced apart locations. Valve 80 is longitudinally translatable within the valve chamber to provide varying degrees of communication with lines 25, 29 through the fluid ports over the range of operating modes of the torque converter 15.

Valve 80 includes a valve head 118, and a longitudinal spool member 81. Spool member 81 has a plurality of spool subsections 86, 88 separated by lands 82, 84. Lands 82, 84 extend radially outwardly from the spool member 81. As such, lands 82, 84 have a greater area than spool members 86, 88, respectively. Lands 82, 84, spool members 86, 88 and the interior wall of the valve chamber cooperate to define subchambers 85, 120 within the valve chamber. Subchamber 120 is defined by area 112 of land 82, area 100 of land 84, and the diameter of spool member 86. Subchamber 85 is defined by area 98 of land 84, the diameter of spool member 88 and area 128 of spool member 88. A spring 122 is provided in subchamber 85, which counteracts pressure applied to valve head 118.

In general, the fluid pressure applied to valve head 118 times area 110 equals the pressure in line 106 times area 128 plus the bias of spring 122. Area 110 is greater than area 128. When the output pressure in line 106 is less than the input pressure applied to head 118, spool 81 is driven down in the valve chamber, opening passage 94, 120. Pressure in the output passage 106 subsequently begins to increase after passage 94, 120 is opened, urging spool 81 upward in the valve chamber. Thus, valve 80 alternates between the up and down positions in real time.

References to an "area" of a land or spool member defining a portion of a valve subchamber generally relate to a calculation of the area of the surface of the respective land or spool member interfacing with fluid in the valve (i.e., for a circular surface, pi times the radius of the circle squared). Chamber 96 is normally exhausted.

In the first phase of torque converter operation, which is the idle or stop phase, control 31 is configured as shown in FIG. 2. Valve 60 is energized by electrical current received from control unit 35, such that control pressure flows through passage 70 to the valve head 118. The pressure applied to valve head 118 forces valve 80 to translate longitudinally downwardly in the valve chamber, compressing spring 122. Downward translation of valve 80 opens fluid passage 120 to connect with main pressure line 94 and feed passage 33.

Valve 130 is a converter flow valve actuated by a solenoid valve 180. Solenoid valve 180 is a normally low, on/off solenoid valve or similar suitable actuator. During the first phase of torque converter operation, valve 180 is de-energized or "off." As such, fluid in line 194 is exhausted through passage 190. During phase I, valve 130 is in the spring set position. In general, the exhaust pressure is in the range of about 0 pounds per square inch (psi).

Valve 180 remains off, and thus valve 130 remains in the spring set position, during the idle, launch, and normal converter operation phases, i.e. phases I, II, and III as shown in FIG. 8. As such, during these phases, feed passage 33 communicates with pump clutch feed passage 25 through subchamber 166 of valve 130.

During phase I, the pressure in main line 94 is the main pressure controlled by the main regulator valve of the fluid supply discussed above. In the illustrative embodiment, the main pressure is in the range of about 50-250 psi. As such, maximum fluid pressure is applied to pump clutch 21 during the first stage of torque converter operation. In the illustrative embodiment, when maximum pressure is applied to pump clutch 21, pump clutch 21 is released or disengaged from the torque converter housing or is otherwise disengaged from the drive unit of the vehicle.

During phases I, II, and III, i.e., during the idle, launch, and normal converter operation stages, fluid from overage reservoir 104 flows to torus cavity 3 and is maintained at a converter in pressure in the range of about 100 psi. Also during these phases, fluid from converter out passage 27 flows to cooler in passage 102 and is maintained at a pressure in the range of about 50 psi.

Figure 3:
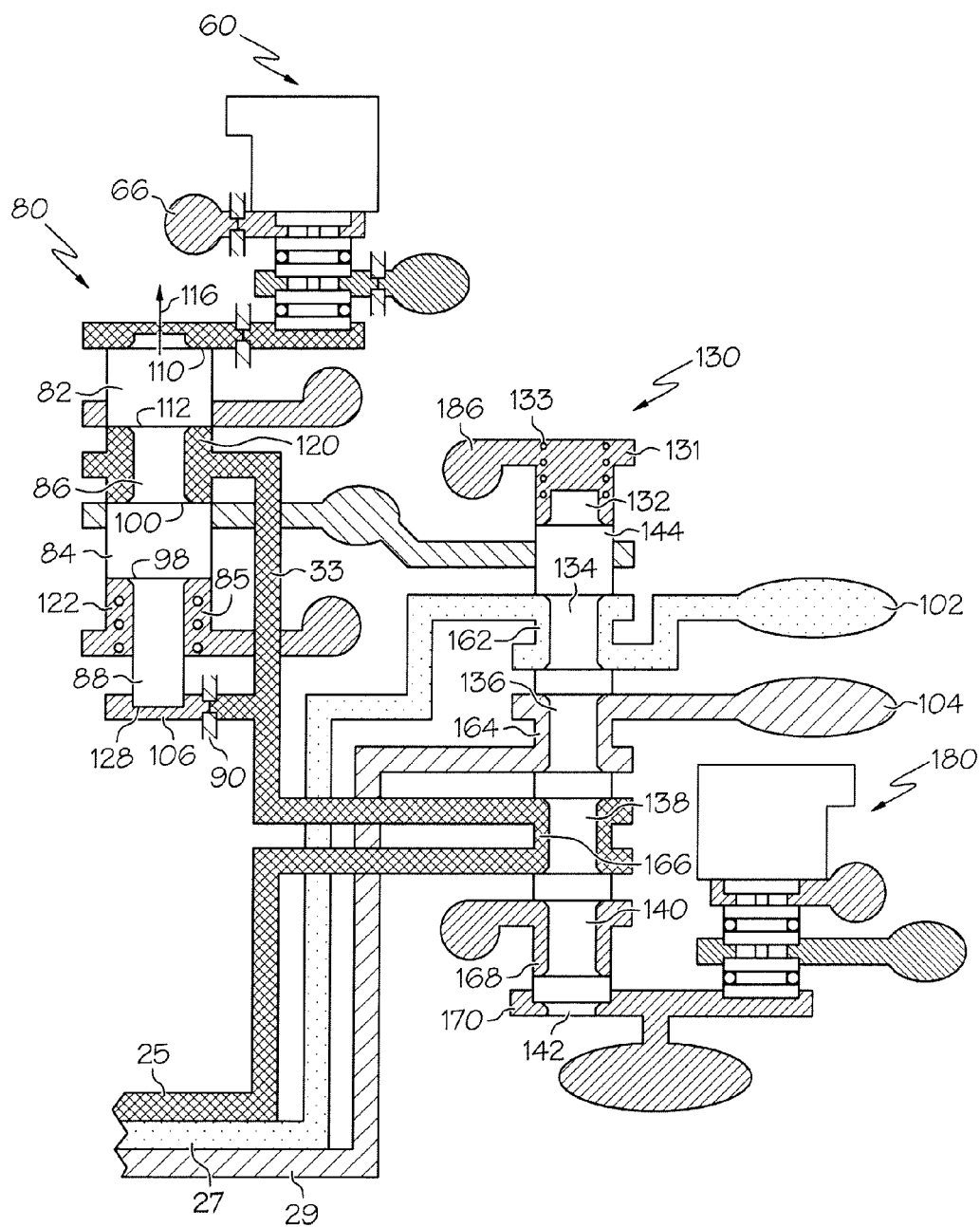
FIG. 3 is a partial schematic of the control assembly of FIG. 2, illustrating fluid flow and fluid pressures when the torque transferring apparatus is operating in a second stage.

During stage II of torque converter operation, i.e., during the launch phase, shown by FIG. 3, fluid pressure in pump cavity and pump feed 25, 33 is gradually decreasing as fluid pressure applied to trim valve head 118 is being trimmed as a result of decreasing current being provided to actuator 60. As the electrical current decreases, restrictor 67 begins to open, allowing fluid to flow to exhaust 66. In the illustrative embodiment, the trim pressure varies in the range of about 0-110 psi.

As pressure applied to valve head 118 decreases, spring 122 forces spool member 81 to translate upwardly in the valve chamber. As valve 80 translates upwardly in the direction of arrow 116, fluid passage 33 is disconnected from main line 94 by the interposition of land 84 therein. As a result, passage 33 is in communication with subchamber 120 of valve 80, subchamber 166 of valve 130 and pump feed passage 25, at the trim pressure. Passage 27 remains in communication with torus cavity 3, subchamber 164 of valve 130, and header 102. Passage 29 remains in communication with lockup cavity 23, subchamber 164 of valve 130, and header 104. Valve 130 remains in the spring set position, as actuator 180 remains in the off position in stage II.

Figure 4:
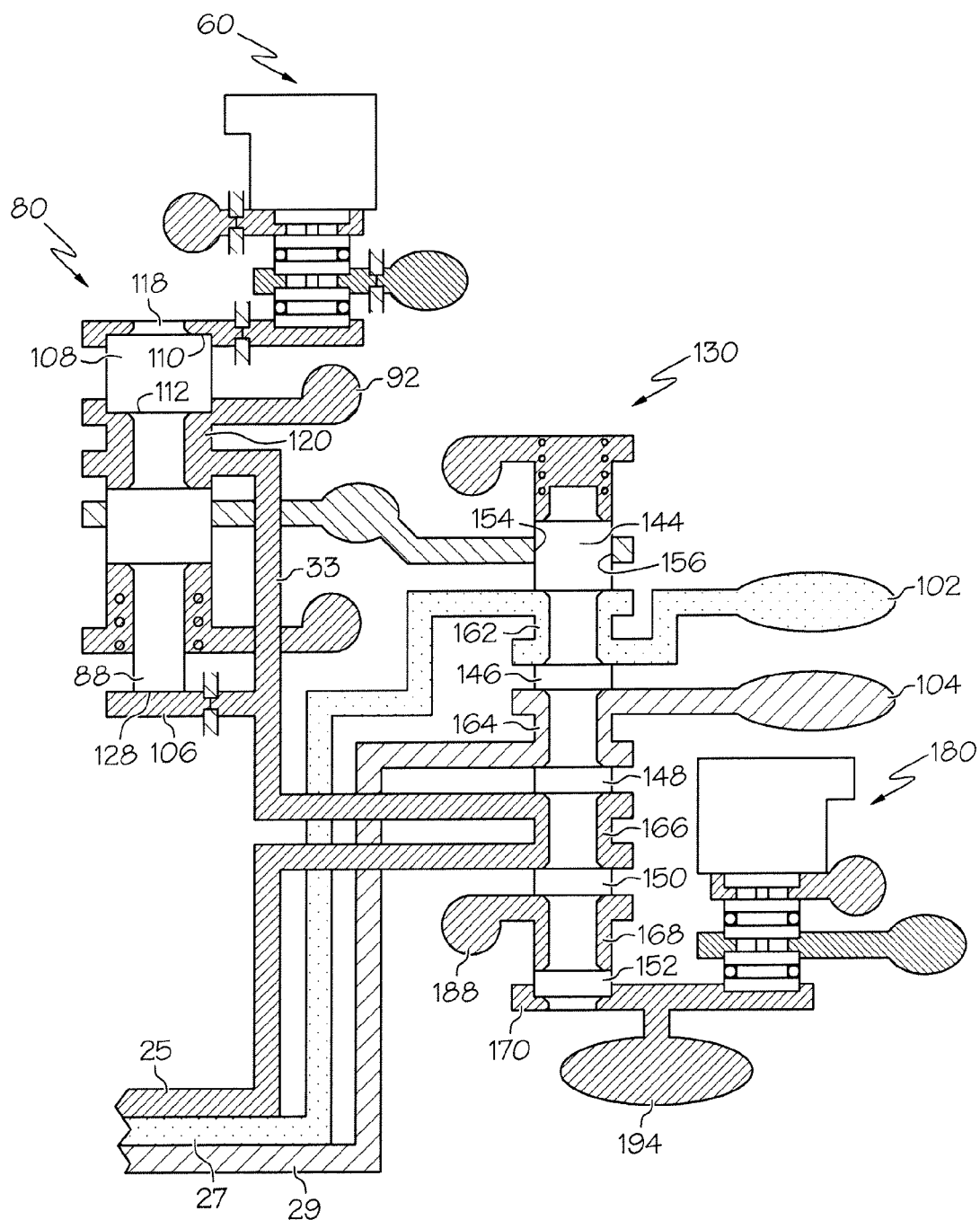
FIG. 4 is a partial schematic of the control assembly of FIG. 2, illustrating fluid flow and fluid pressures when the torque transferring apparatus is operating in a third stage.

During stage III of torque converter operation, i.e., during the normal converter operation (torque multiplication) phase, shown by FIG. 4, actuator 60 is de-energized and fluid pressure in the pump cavity 21 and lines 25, 33 is at a minimum (exhaust pressure or about 0 psi). Valve 80 is fully biased in the upward position in the valve chamber by spring 122. Valve head 118 and area 110 of land 82 are now interposed in fluid passage 70 such that no pressure is applied to valve head 118 from passage 70 in stage III. Subchamber 120 of valve 80 is in fluid communication with exhaust port 92, line 33, subchamber 166 of valve 130, and pump feed passage 25 at the exhaust pressure. Passage 27 remains in communication with torus cavity 3, subchamber 162 of valve 130, and header 102, and passage 29 remains in communication with lockup cavity 23, subchamber 164 of valve 130, and header 104, as described above.

Valve 130 remains in the spring set position, as actuator 180 remains in the off position, in stage III. With the fluid pressure in the pump cavity at a minimum, the pump clutch 21 is applied to engage the torque converter 15 with the vehicle drive unit. In the illustrative embodiment, the pressure in the pump cavity and thus in line 25 remains at a minimum, and thus the pump clutch 21 remains applied, during the subsequent phases IV and V of torque converter operation as shown by the graph of FIG. 7 and indicated in the table of FIG. 8.

Figure 5:
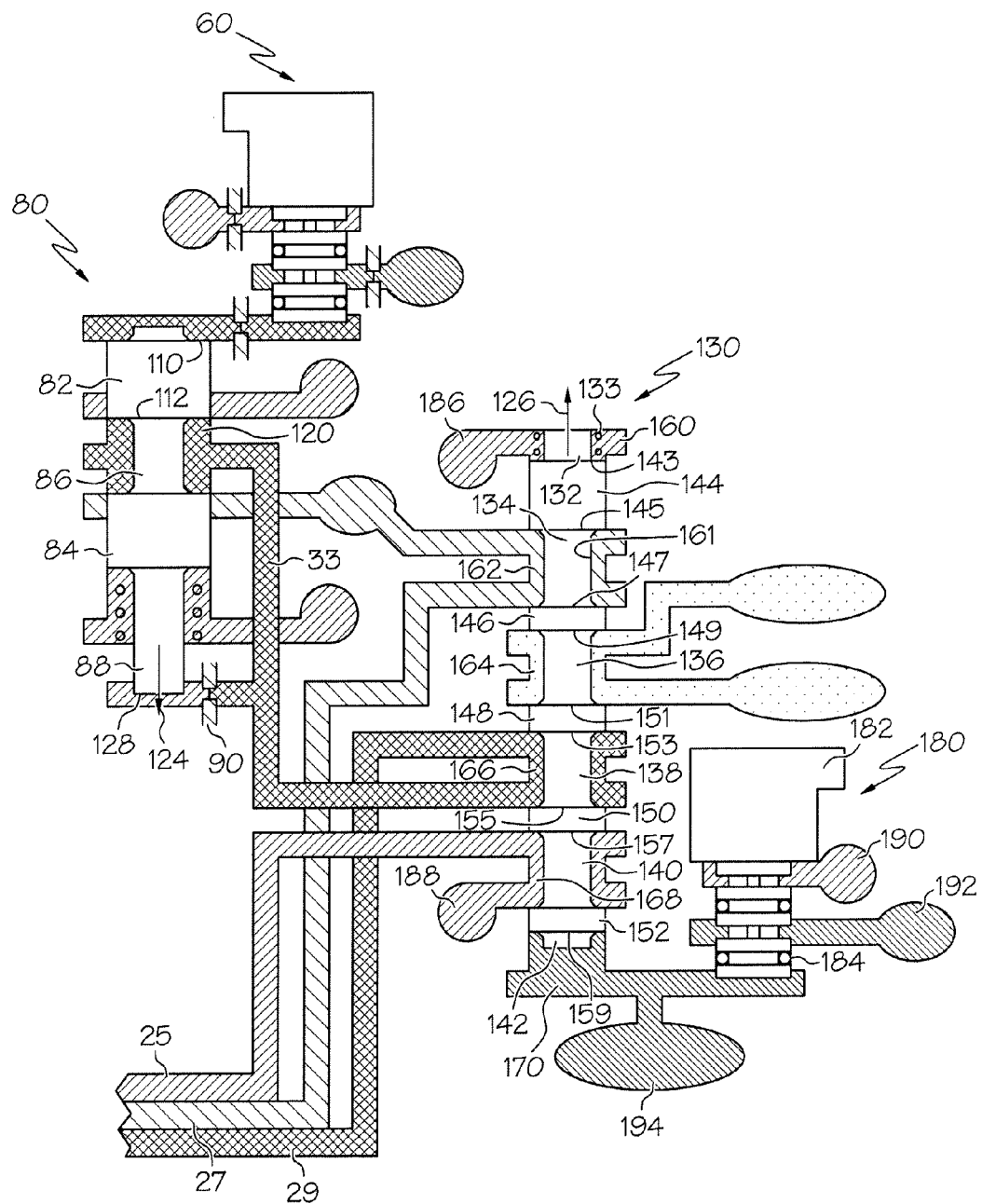
FIG. 5 is a partial schematic of the control assembly of FIG. 2, illustrating fluid flow and fluid pressures when the torque transferring apparatus is operating in a fourth stage.

During the fourth stage of torque converter operation, referred to herein as the "TCC trim" phase, the lockup clutch 23 is being trimmed while the pump clutch 21 remains engaged. Actuator 180 is energized by an electrical signal from control unit 35 over via line 39. Activation of valve 180 results in valve 130 translating upwardly in the direction of arrow 126, into the pressure set position, as control pressure is allowed to flow to the valve head 142 as shown in FIG. 5. When valve 130 is in the pressure set position, fluid flow is redirected and flows to lockup clutch feed 29 instead of pump clutch feed 25.

Valve 130 is a converter flow valve, also known as a logic valve or relay valve. Valve 130 is situated in a more or less cylindrical valve chamber of a housing, which is not shown for simplicity. A plurality of fluid ports extend through the housing into the valve chamber at spaced apart locations. Valve 130 is longitudinally translatable within the valve chamber to provide varying degrees of communication with lines 25, 27, and 29 through the fluid ports over the range of operating modes of the torque converter 15.

Valve 130 includes a valve head 142, and a longitudinal spool member 161. Spool member 161 has a plurality of spool subsections 132, 134, 136, 138, 140 separated by lands 144, 146, 148, 150, 152. Lands 144, 146, 148, 150, 152 extend radially outwardly from the spool member 161. Lands 144, 146, 148, 150, 152, spool subsections 132, 134, 136, 138, 140 and the interior wall of the valve chamber cooperate to define subchambers 160, 162, 164, 166, 168, 170 within the valve chamber. Subchamber 160 is defined by area 143 of land 144 and the diameter of spool member 132. Subchamber 162 is defined by area 145 of land 144, the diameter of spool member 134, and area 147 of land 146. Subchamber 164 is defined by area 149 of land 146, the diameter of spool subsection 136, and area 151 of land 148. Subchamber 166 is defined by area 153 of land 148, the diameter of spool member 138, and area 155 of land 150. Subchamber 168 is defined by area 157 of land 150, the diameter of spool member 140, and area 163 of land 152. A portion of area 159 of land 152 and valve head 142 is interposed in head chamber 170, which is in fluid communication with knockdown header 194 and actuator 180.

As mentioned above, actuator 180 is a solenoid valve or similar type actuator coupled to transmission control module 35. In the illustrative embodiment, actuator 180 includes a normally low, on-off solenoid 182 and a spring 184. During the idle, launch and normal converter operational stages of torque converter 15, actuator 180 is off, de-energized, or otherwise deactivated as indicated in the table of FIG. 8. As such, during these phases, valve 130 is biased in the spring set or "down" position by spring 133 and valve head 142 and a portion of land 152 are interposed in head chamber 170 during phases I, II and III.

In the spring set position of stages I-III, spring 133 is uncompressed. As such, during these stages, subchamber 162 is in fluid communication with coolant reservoir 102 and passage 27 at the lube pressure; subchamber 164 is in fluid communication with overage header 104 and lockup clutch feed passage 29 at the converter pressure; subchamber 166 is in fluid communication with trim valve 80 via line 33 and is in fluid communication with pump clutch feed passage 25; subchamber 168 is in fluid communication with exhaust chamber 188; and chamber 170 is in communication with knockdown header 194, as shown in FIGS. 2-4.

Figure 6:
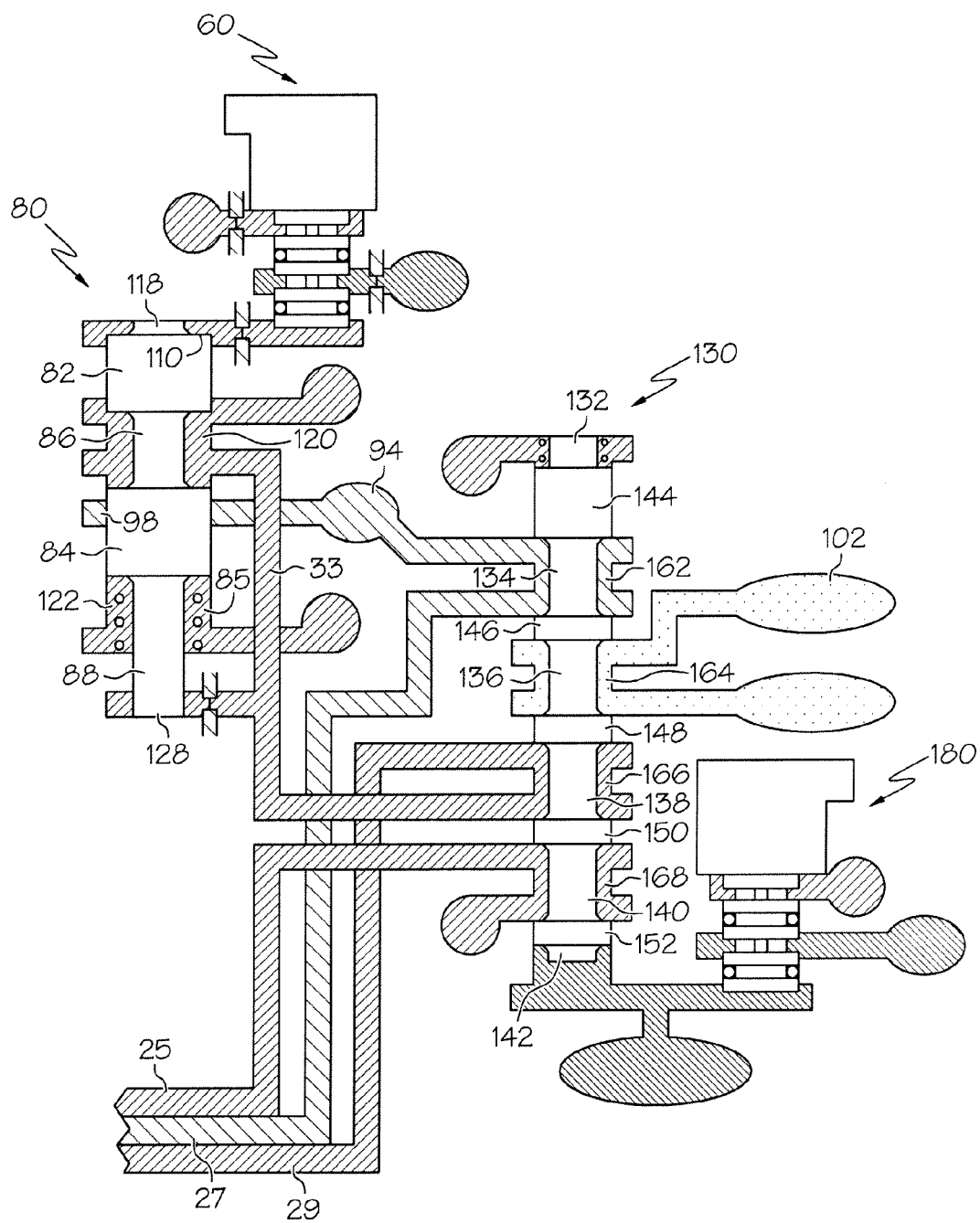
FIG. 6 is a partial schematic of the control assembly of FIG. 2, illustrating fluid flow and fluid pressures when the torque transferring apparatus is operating in a fifth stage.

When actuator 180 is activated or energized, valve 130 is shifted to the pressure set or "up" position as shown in FIGS. 5-6. In the pressure set position, fluid at the control pressure is applied to valve head 142 through chamber 170, thereby compressing spring 133.

In the TCC trim stage or phase IV of the torque converter operation, shown by FIG. 5, the torque converter clutch or lockup clutch 23 is trimming, and the pressure in the lockup clutch cavity is gradually decreasing as shown by the graph of FIG. 7. Whereas the fluid pressure in the lockup cavity and lockup feed passage 29 was previously at the normal torque converter pressure, it is now at the trim pressure by virtue of the coupling of trim valve 80 to lockup feed 29 by subchamber 166. Trim valve 80 is in a similar state to FIG. 3, i.e., electrical current at actuator 60 is being varied to adjust the fluid pressure being applied to valve head 118.

Also during phase IV, subchamber 162 of valve 130 is in fluid communication with main pressure line 94 and passage 27, thereby increasing the fluid pressure in torus cavity 3 as shown by the graph of FIG. 7. Subchamber 164 is in fluid communication with headers 102, 104. Subchamber 166 connects trim passage 33 with lockup passage 29 and subchamber 168 connects pump feed 25 to exhaust 188.

During phase V, control 31 assumes the configuration shown in FIG. 6. In this phase, the lockup clutch or torque converter clutch 23 is applied while the pump clutch 21 remains engaged. Logic valve 130 remains in the pressure set or "up" position, however, trim valve 80 is fully translated upwardly in the direction of arrow 124, causing subchamber 120 to connect with exhaust header 92, thereby connecting lockup passage 29 to exhaust via passage 33 and subchamber 166 of valve 130. Solenoid 60 opens orifice 67 fully so that line 70 is exhausted to outlet 66.

With fluid pressure at a minimum in lockup clutch feed line 29, lockup clutch is engaged, thereby achieving a mechanical/frictional coupling between the torque converter 15 and the vehicle transmission. With both the pump clutch and the torque converter clutch engaged, a mechanical/frictional coupling is achieved from the vehicle drive unit through the torque converter to the transmission input shaft.

A graph illustrating the relative changes in fluid pressure in the pump, torus, and lockup cavities of torque converter 15 through the various stages of operation I, II, III, IV and V, is shown in FIG. 7. Line 200 represents the pressure in the pump cavity 21, 25, line 202 represents the pressure in the lockup cavity 23, 29, and line 204 represents the pressure in the torus cavity 3. During the idle or stop phase I, fluid pressure in both the pump and lockup cavities is high. Pressure in the pump cavity 21, 25 decreases during the launch phase, according to a variable k factor method, for example, as the pump clutch 21 prepares to engage. Pressure in the pump cavity 21, 25 is at a minimum during the subsequent phases II, IV and V, as the pump clutch 21 is engaged.

During the first three stages I, II, and III, fluid pressure in the lockup cavity 23,29 remains substantially constant. In stage IV, the fluid pressure in the lockup cavity 23, 29 is adjusted, according to an electronic torque converter clutch control algorithm, for example, as the lockup clutch 23 prepares to engage. Pressure in the lockup cavity 23, 29 is at a minimum during the lockup phase V.

During the first three stages I, II, and III, fluid pressure in the torus cavity 3 remains substantially constant. Pressure in the torus cavity 3 may be increased in stage IV to provide "knockdown" on the main regulator valve when the lockup clutch 23 is applied. The knockdown feature essentially reduces the fluid pressure at the main regulator valve of the main hydraulic fluid supply. The increased torus cavity pressure is maintained through stage V, as the lockup clutch 23 is applied. However, control 31 maintains the torus cavity pressure below the main pressure to prevent ballooning of the torus cavity 3.

The states or settings of various components of torque converter 15 and control 31 through the operational stages I, II, III, IV and V are shown in the table of FIG. 8 and discussed above. Stages I, II, III, IV and V of FIG. 8 correspond to the stages I, II, III, IV and V of FIG. 7.

FIG. 9 illustrates an example of computer operations executable by control unit 32, 35 to provide torque converter control 30, 31. Computer program 210 includes instructions for executing a first computer process 212 of monitoring one or more vehicle state indicators. Vehicle state indicators may include but are not limited to electrical signals indicating a current status or condition of a component of the vehicle, which may be sensed or otherwise determined or estimated, such as engine speed, vehicle speed, turbine speed, transmission gear ratio, fluid pressures, fluid temperatures, pump clutch status, torque converter clutch status, brake position, torque converter slip, and others. One or more of the vehicle state indicators are analyzed or evaluated by process 212, to determine the current stage of vehicle or torque converter operation, for example.

A decisional process 214 determines whether it is necessary to control one or another of the multiple torque converter couplers or clutches, based on the one or more of the vehicle parameters. As described above, in the illustrative embodiment, the converter flow valve and its actuator determine whether the pump clutch or the lockup clutch is being controlled. Thus, at decisional block 214, if the vehicle is in one of stages I, II or III (i.e., idle, lockup, or normal converter operation), or if analysis of some other vehicle parameter indicates that a first coupler needs to be controlled, then at functional block 216 the first actuator will be set to a first state such that the first coupler will be controlled by the trim system. For example, in the illustrative embodiment, if the vehicle is in stage I, II or III, then valve 180 will be deactivated or set to the off position, so that converter flow valve 130 connects the trim system 60, 80 to the pump clutch feed 25 to thereby control the engagement and disengagement of the pump clutch 21.

If the vehicle is not in one of stages I, II or III, or if analysis of some other vehicle parameter indicates that a second coupler needs to be controlled, then at functional block 220 the first actuator will be set to a second state such that the second coupler will be controlled by the trim system. For example, in the illustrative embodiment, if the vehicle is in stage IV or V, then valve 180 will be activated or set to the on position, so that converter flow valve 130 connects the trim system 60, 80 to the lockup clutch feed 29 to thereby control the engagement and disengagement of the lockup clutch 23.

At functional block 222, electrical signals are sent to the trim system as needed to control operation of the trim system as it relates to the selected clutch that is currently under control. In the illustrative embodiment, if the pump clutch 21 is being controlled, appropriate electrical signals will be sent to the actuator 60 according to the stage of torque converter operation or other factors. For example, if the torque converter 15 is in the idle stage, an electrical signal will be sent to actuator 60 thereby causing fluid pressure to be applied to valve head 118, resulting in disengagement of the pump clutch 21. Appropriate electrical signals are likewise sent to actuator 60 to control the lockup clutch 23 when valve 130 has been moved to the pressure set position.

The present disclosure describes patentable subject matter with reference to certain illustrative embodiments. The drawings are provided to facilitate understanding of the disclosure, and may depict a limited number of elements for ease of explanation. Except as may be otherwise noted in this disclosure, no limits on the scope of patentable subject matter are intended to be implied by the drawings. Variations, alternatives, and modifications to the illustrated embodiments may be included in the scope of protection available for the patentable subject matter.

The invention claimed is:

1. A control for a torque converter comprising a pump, a turbine fluidly coupled to the pump, a pump clutch to selectively mechanically couple the pump to a vehicle drive unit, and a torque converter clutch to selectively mechanically couple the pump to the turbine, the control comprising:
a valve and fluid passage assembly operably coupled to the torque converter to control the engagement and disengagement of a pump clutch and the torque converter clutch during a plurality of phases of operation of the torque converter, the valve and fluid passage assembly including a pressure control valve multiplexed to control the engagement and disengagement of the pump clutch and the torque converter clutch; and
a fluid flow control valve in fluid communication with the pressure control valve to selectively alter the path of fluid flow from the at least one pressure control valve to the fluid passage assembly; wherein the fluid flow control valve comprises a first fluid chamber configured to selectively communicate with the pump clutch, a second fluid chamber configured to selectively communicate with the torque converter clutch, and a third fluid chamber configured to selectively communicate with one of the pump clutch and the torque converter clutch.

2. The control of claim 1, wherein the fluid flow control valve has a first position and a second position, and when the fluid flow control valve is in the first position, the third fluid chamber is in fluid communication with the pump clutch, and when the fluid flow control valve is in the second position, the third fluid chamber is in fluid communication with the torque converter clutch.

3. The control of claim 2, wherein when the third fluid chamber is in fluid communication with the pump clutch, the first fluid chamber is in fluid communication with the torque converter clutch.

4. The control of claim 3, wherein when the third fluid chamber is in communication with the torque converter clutch, the second fluid chamber is in fluid communication with the pump clutch.

5. The control of claim 4, comprising an actuator coupled to the fluid flow control valve to change the position of the fluid flow control valve.

6. The control of claim 5, comprising an electrical control unit configured to send electrical signals to the actuator to change the position of the fluid flow control valve.

7. A control for a torque converter comprising a pump, a turbine fluidly coupled to the pump, a pump clutch to selectively mechanically couple the pump to a vehicle drive unit, and a torque converter clutch to selectively mechanically couple the pump and the turbine, the control comprising a valve system operably couplable to the torque converter to control the engagement, trimming, and disengagement of the pump clutch and the torque converter clutch during a plurality of phases of operation of the torque converter, the valve system being multiplexed to control both of the pump clutch and the torque converter clutch, the valve system comprising a fluid flow control valve comprising a first fluid chamber configured to selectively communicate with the pump clutch, a second fluid chamber configured to selectively communicate with the torque converter clutch, and a third fluid chamber configured to selectively communicate with one of the pump clutch and the torque converter clutch.

8. The control of claim 7, wherein the valve system comprises a trim valve and a logic valve in fluid communication with the trim valve via a fluid passage.

9. The control of claim 8, wherein the valve system comprises a plurality of fluid passages configured to connect the pump clutch and the torque converter clutch to the logic valve.

10. The control of claim 9, wherein the valve system is incorporated in an electro-hydraulic control system for a vehicle transmission.

11. A control for a torque transferring apparatus of a vehicle, comprising:
an actuator having a first actuator state and a second actuator state,
a flow control device having a first device state and a second device state, the flow control device being in fluid communication with the actuator, such that when the actuator is in the first actuator state and the flow control device is in the first device state, the actuator and the flow control device are in fluid communication with a pump clutch of a torque converter, the pump clutch being coupled to a pump of the torque converter and being selectively couplable to a portion of the drive unit of the vehicle, the drive unit being configured to provide torsional input to the first portion of the torque transferring apparatus, and when the actuator is in the second actuator state and the flow control device is in the second device state, the actuator and the flow control device are in fluid communication with a torque converter clutch of the torque converter, the torque converter clutch being selectively couplable to the pump of the torque converter, wherein the flow control device comprises a first fluid chamber configured to selectively communicate with the pump clutch, a second fluid chamber configured to selectively communicate with the torque converter clutch, and a third fluid chamber configured to selectively communicate with one of the pump clutch and the torque converter clutch.

12. The control of claim 11, comprising a pressure control device in fluid communication with the flow control device.

13. The control of claim 11, wherein the actuator is "off" in the first actuator state, and the actuator is "on" in the second actuator state.

14. The control of claim 12, wherein the flow control device is a flow valve and the flow valve is in a spring set position in the first device state, and the flow valve is in a pressure set position in the second device state.

15. The control of claim 11, wherein when the flow control device is in the first device state, the second coupler is disengaged.

16. The control of claim 15, wherein when the flow control device is in the second device position, the pump clutch is engaged.

17. A control for a torque converter, the torque converter comprising a pump and a turbine fluidly coupled to the pump and configured to transfer torque from a drive unit of a motor vehicle to a driven unit of the motor vehicle, the control comprising:

a fluid supply, a control assembly operably coupled to the fluid supply, the control assembly including a fluid pressure control apparatus and a fluid flow control apparatus in fluid communication with the fluid pressure control apparatus, and electrical circuitry operably coupled to the control assembly, the control being configured to cause a torque converter pump clutch to selectively engage and disengage from an output member of a vehicle drive unit and to cause a torque converter clutch to selectively engage and disengage from the torque converter pump with the fluid flow control apparatus, the fluid flow control apparatus configured to selectively alter the path of fluid flow from the fluid pressure control apparatus to the control assembly; wherein the fluid flow control apparatus comprises a first fluid chamber configured to selectively communicate with the pump clutch, a second fluid chamber configured to selectively communicate with the torque converter clutch, and a third fluid chamber configured to selectively communicate with one of the pump clutch and the torque converter clutch.

18. The control of claim 17, wherein the fluid pressure control apparatus comprises a trim valve and the fluid flow control apparatus comprises a flow valve having a first state and a second state, comprising an actuator configured to selectively change the state of the flow valve from the first state to the second state.

19. The control of claim 18, wherein the controller is configured to send at least one electrical signal to the actuator to change the state of the flow valve.

20. The control of claim 18, wherein the flow valve is configured to control the torque converter pump clutch when the flow valve is in the first state and the flow valve is configured to control torque converter clutch when the flow valve is in the second state.

21. A control for a torque converter of a vehicle, comprising:

an electrical control apparatus configured to receive signals indicative of the operational state of a vehicle and execute executable instructions to control operation of the torque converter, and a computer-readable medium accessible by the electrical control apparatus, the computer-readable medium comprising executable instructions to:

determine an operational state of a vehicle having a drive unit, a transmission, and a torque converter comprising a pump and a turbine fluidly coupled to the pump and configured to transfer torque from the drive unit to the transmission, the torque converter having a torque converter pump clutch coupled to the pump of torque converter and being selectively couplable to an output member of the vehicle drive unit, torque converter having a torque converter clutch coupled to the turbine of the torque converter and being selectively couplable to the pump of the torque converter by a fluid flow control valve in fluid communication with a pressure control valve to selectively alter the path of fluid flow from the at least one pressure control valve to the fluid passage assembly; wherein the fluid flow control valve comprises a first fluid chamber configured to selectively communicate with the pump clutch, a second fluid chamber configured to selectively communicate with the torque converter clutch, and a third fluid chamber configured to selectively communicate with one of the pump clutch and the torque converter clutch, and selectively change a state of a torque converter control assembly from a first state to a second state in response to a change in the operational state of the vehicle.

22. The control of claim 21, wherein the torque converter control assembly includes at least one electro-hydraulic apparatus and selectively changing a state of the torque converter control assembly comprises selectively applying electrical current to a portion of the electro-hydraulic apparatus.

23. The control of claim 22, wherein the torque converter control assembly is configured to selectively alter fluid pressure in at least a portion of the electro-hydraulic apparatus based on the operational state of the vehicle and the torque converter control assembly is configured to selectively alter a path of fluid flow in at least a portion of the electro-hydraulic apparatus based on the operational state of the vehicle.

24. The control of claim 21, wherein at least the electrical control apparatus is incorporated in a transmission control module of the vehicle.

25. The control of claim 1, wherein the valve and fluid passage assembly comprises a first conduit fluidly coupling the pressure control valve with the pump clutch and a second conduit fluidly coupling the pressure control valve with the torque converter clutch.

26. The control of claim 25, wherein the valve and fluid passage assembly comprises a fluid flow valve, the first conduit fluidly couples the pressure control valve with the pump clutch through a first chamber of the fluid flow valve, the second conduit fluidly couples the pressure control valve with the torque converter clutch through a second chamber of the fluid flow valve, and the valve and fluid passage assembly comprises a third conduit fluidly coupling the fluid flow valve with a torus cavity of the torque converter.

* * * * *